United States Patent
Dawe et al.

(10) Patent No.: US 11,163,462 B1
(45) Date of Patent: Nov. 2, 2021

(54) AUTOMATED RESOURCE SELECTION FOR SOFTWARE-DEFINED STORAGE DEPLOYMENT

(71) Applicant: EMC IP Holding Company LLC, Hopkinton, MA (US)

(72) Inventors: Trevor H. Dawe, Riverview (CA); Sean R. Gallacher, Moncton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/861,371

(22) Filed: Apr. 29, 2020

(51) Int. Cl.
*G06F 3/06* (2006.01)
*H04L 29/08* (2006.01)

(52) U.S. Cl.
CPC .......... *G06F 3/0631* (2013.01); *G06F 3/0604* (2013.01); *G06F 3/067* (2013.01); *G06F 3/0659* (2013.01); *G06F 3/0662* (2013.01); *H04L 67/1097* (2013.01)

(58) Field of Classification Search
CPC ...... G06F 3/0631; G06F 3/0662; G06F 3/067; G06F 3/0604; G06F 3/0659; H04L 67/1097
See application file for complete search history.

(56) References Cited

U.S. PATENT DOCUMENTS

| 7,752,615 B1 | 7/2010 | Perry et al. |
| 10,540,165 B2 | 1/2020 | Kinlen et al. |
| 2010/0287306 A1* | 11/2010 | Matsuda ............... H04L 45/124 709/242 |
| 2017/0235761 A1 | 8/2017 | Bafna et al. |
| 2020/0081704 A1 | 3/2020 | Bafna et al. |
| 2021/0109683 A1* | 4/2021 | Cain .................... G06F 11/1458 |

\* cited by examiner

*Primary Examiner* — Masud K Khan
(74) *Attorney, Agent, or Firm* — Ryan, Mason & Lewis, LLP (57) ABSTRACT

Methods, apparatus, and processor-readable storage media for automated resource selection for software-defined storage deployment are provided herein. An example computer-implemented method includes obtaining a software-defined storage deployment request from a user, the request comprising an amount of total storage capacity and a minimum number of servers; generating an in-memory data structure of at least a portion of an inventory associated with the user, wherein the inventory comprises servers and disks associated with the servers, and wherein the data structure organizes the inventory based on disk size and disk count per server; calculating, using at least the data structure, total storage capacity for each of multiple combinations of disk sizes and disk counts across the servers; determining at least one of the combinations, based on the total storage calculations, that satisfies the request; and performing at least one automated action based on the combination(s) determined to satisfy the request.

20 Claims, 7 Drawing Sheets

AUTOMATED RESOURCE SELECTION FOR SOFTWARE-DEFINED STORAGE DEPLOYMENT

FIELD

The field relates generally to information processing systems, and more particularly to storage in such systems.

BACKGROUND

When users are deploying software-defined storage stacks in a given environment, the users are tasked with selecting the servers and/or disks that will be used by the storage stack. Commonly, servers and/or disks are selected in an attempt to accommodate current and future storage needs. However, such selection determinations typical involve tying-up inventory resources, as conventional storage approaches prevent the usage of servers and/or disks for other software deployments, installations, workloads, etc. during selection determinations.

SUMMARY

Illustrative embodiments of the disclosure provide techniques for automated resource selection for software-defined storage deployment. An exemplary computer-implemented method includes obtaining a software-defined storage deployment request from at least one user, wherein the request comprises a requested amount of total storage capacity and a minimum number of servers to be utilized for the software-defined storage deployment, and generating an in-memory data structure of at least a portion of an inventory associated with the at least one user, wherein the inventory comprises multiple servers and multiple disks associated with the multiple servers, and wherein the in-memory data structure organizes the at least a portion of the inventory based at least in part on disk size and disk count per server. Such a method also includes calculating, using at least the in-memory data structure, total storage capacity for each of multiple combinations of one or more disk sizes and one or more disk counts across one or more of the multiple servers within the inventory. Further, such a method includes determining at least one of the multiple combinations, based on the total storage calculated for each of the multiple combinations, that satisfies the software-defined storage deployment request, and performing at least one automated action based at least in part on the at least one combination determined to satisfy the software-defined storage deployment request.

Illustrative embodiments can provide significant advantages relative to conventional storage approaches. For example, problems associated with preventing the usage of inventory resources during resource selection determinations are overcome in one or more embodiments through dynamically performing calculations based on an in-memory data structure that organizes an inventory by disk size and disk count per server.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
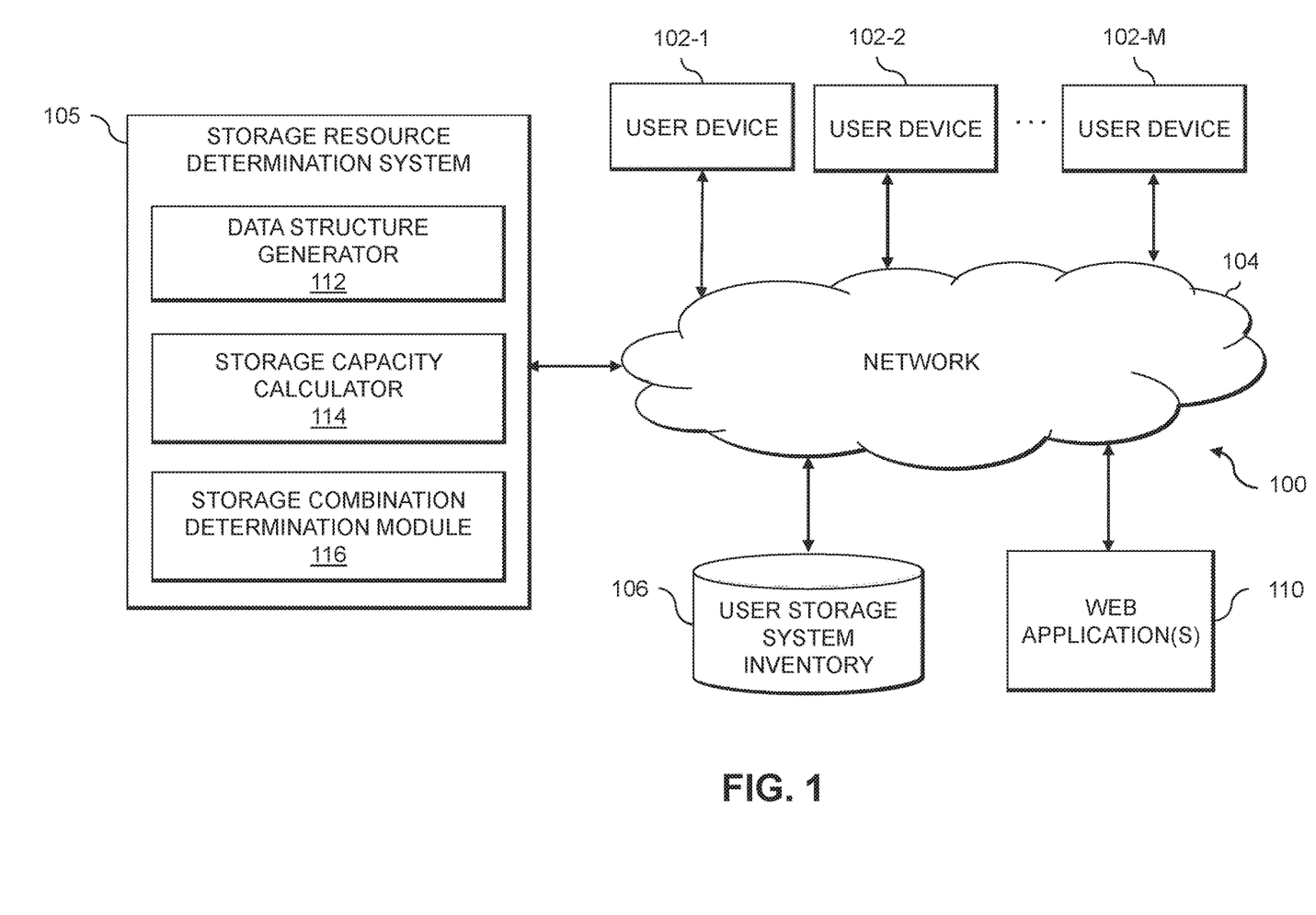
FIG. 1 shows an information processing system configured for automated resource selection for software-defined storage deployment in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is storage resource determination system 105 and web application(s) 110 (e.g., storage deployment applications, monitoring applications, etc.).

The user devices 102 may comprise, for example, mobile telephones, laptop computers, tablet computers, desktop computers or other types of computing devices, including devices associated with storage systems. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the storage resource determination system 105 can have an associated database 106 configured to store data pertaining to user storage system inventory information, which comprise, for example, lists or other identifications of servers and associated disks contained within the storage systems of one or more particular users and/or user systems. This and other references to "disks" herein are intended to refer generally to storage devices, including solid-state drives (SSDs), and should therefore not be viewed as limited in any way to spinning magnetic media.

The database 106 in the present embodiment is implemented using one or more storage systems associated with the storage resource determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the storage resource determination system 105 can be input-output devices, which illustratively comprise keyboards, displays or other types of input-output devices in any combination. Such input-output devices can be used, for example, to support one or more user interfaces to the storage resource determination system 105, as well as to support communication between the storage resource determination system 105 and other related systems and devices not explicitly shown.

Additionally, the storage resource determination system 105 in the FIG. 1 embodiment is assumed to be implemented using at least one processing device. Each such processing device generally comprises at least one processor and an associated memory, and implements one or more functional modules for controlling certain features of the storage resource determination system 105.

More particularly, the storage resource determination system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the storage resource determination system 105 to communicate over the network 104 with the user devices 102, and illustratively comprises one or more conventional transceivers.

The storage resource determination system 105 further comprises a data structure generator 112, a storage capacity calculator 114, and storage combination determination module 116.

It is to be appreciated that this particular arrangement of modules 112, 114 and 116 illustrated in the storage resource determination system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automated resource selection for software-defined storage deployment involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example storage resource determination system 105 in computer network 100 will be described in more detail with reference to the flow diagram of FIG. 3.

Accordingly, at least one embodiment includes automated resource selection for software-defined storage deployment. By selecting only those servers and/or disks needed to fulfill a request for an immediate storage need and growing the storage stack elastically, other resources are freed for other workloads and software-defined storage stack deployments. As such, one or more embodiments include implementing a mechanism to select only those servers and/or disks required to fulfill a user's request for a specified amount of storage capacity.

At least one embodiment includes processing one or more forms of input data, which can include, for example, information pertaining to inventory servers (e.g., a list of servers and disks (names and sizes) that will be considered for the deployment of software-defined storage), storage request information (e.g., a request for a certain amount of storage), and a minimum server count (e.g., the minimum number of nodes required for the software-defined storage stack). As used herein, a node refers to a server (i.e., the terms are used interchangeably herein), wherein servers generally encompass processing devices that contain one or more disks which will and/or can be used for a storage stack deployment.

As detailed herein, at least one embodiment includes, in response to a user-submitted storage deployment request, performing one or more calculations to determine the required total raw storage per server for the requested storage capacity. As used herein, "raw" storage refers to the total summation of storage of the disk(s) on a collection of one or more servers. For example, raw storage=the size of disk-1+the size of disk-2+the size of disk-n. Also, raw storage is different from usable storage. By way of example, after deploying a storage stack across 300 gigabytes (GB) of raw storage, there may only be 100 GB of usable storage due to some of the raw storage being used for data redundancy or other uses.

Required total raw storage per server calculations can include, for example, considering parameters such as spare capacity (e.g., extra capacity on each node required for replicating data across cluster nodes) and usable storage (e.g., the actual amount of usable storage that is needed to satisfy the storage request). Additionally, such calculations are based at least in part on requirements and/or specifications defined by each software-defined storage stack associated with the request.

It is also noted that a user's inventory may contain multiple (e.g., hundreds or thousands) servers and disks that are available for deployment of software-defined storage. Accordingly, an example issue that can arise with analyzing inventory to select resources for deployment is performance. For example, analyzing different combinations of servers and disks can have exponential growth, especially in environments where thousands of servers exist. Accordingly, at least one embodiment includes organizing a user's inventory into an in-memory data structure that is efficient to traverse.

Using such an organizational structure, one or more embodiments include determining a set of servers (greater than or equal to minimum server count) and disks on those servers (from the user's inventory) that satisfy one or more of the following parameters: the minimum number of servers necessary are selected, the minimum number of disks (same size and count) necessary on those servers are selected, and the selected combination of servers and disks has a total raw storage greater than or equal to the total required raw storage required to satisfy the deployment request.

In order to analyze multiple combinations of servers and disks within an inventory, at least one embodiment includes determining disk sizes and the quantities of disks of each size available on each server. Therefore, such an embodiment includes further organizing an in-memory data structure (e.g., a structure similar to a database table) of the user's inventory (such as noted above) into a data structure based at least in part on disk size and disk count per server. Organizing at least portions of a user's inventory into such a data structure facilitates total raw capacity calculations to be performed for multiple combinations of a specific disk size and count across applicable servers, in a linear growth fashion. By way merely of example and illustration, consider the following example inventory:

Server-1 [/dev/sdb: 100 GB, /dev/sdc: 100 GB, /dev/sdd: 200 GB, /dev/sde: 500 GB]

Server-2 [/dev/sdb: 100 GB, /dev/sdc: 100 GB, /dev/sdd: 200 GB, /dev/sde: 500 GB]

Server-3 [/dev/sdb: 100 GB, /dev/sdc: 100 GB, /dev/sdd: 200 GB, /dev/sde: 1 TB]

This example inventory, in accordance with one or more embodiments, can be organized into the following example data structure, which includes five combinations:

Device Size=100 GB, Device Count=1, Servers=[Server-1, Server-2, Server-3]

Device Size=100 GB, Device Count=2, Servers=[Server-1, Server-2, Server-3]

Device Size=200 GB, Device Count=1, Servers=[Server-1, Server-2, Server-3]

Device Size=500 GB, Device Count=1, Servers=[Server-1, Server-2]

Device Size=1 TB, Device Count=1, Servers=[Server-3]

Additionally, at least one embodiment includes using a data structure of a user inventory, such as detailed in the above example, to calculate the total raw storage per server for each combination. In one or more embodiments, such a calculation is performed only for combinations that include a server count greater than or equal to the minimum number of servers required for the deployment request. By way merely of illustration, using the example inventory and data structure above, if the input value provided (in connection with the request) for the minimum server count is three, such an embodiment can include performing total raw storage calculations (i.e., total raw capacity per server=device size*device count per server) as follows:

Device Size=100 GB, Device Count=1, Servers=[Server-1, Server-2, Server-3], Total Raw Capacity Per Server=100 GB Device Size=100 GB, Device Count=2, Servers=[Server-1, Server-2, Server-3], Total Raw Capacity Per Server=200 GB Device Size=200 GB, Device Count=1, Servers=[Server-1, Server-2, Server-3], Total Raw Capacity Per Server=200 GB Device Size=500 GB, Device Count=1, Servers=[Server-1, Server-2]→Skipped Device Size=1 TB, Device Count=1, Servers=[Server-3]→Skipped One or more embodiments also include determining, based on the above-noted calculations, the most appropriate and/or beneficial result (i.e., combination of servers and disks), if one exists. By way merely of illustration, consider an example scenario wherein requested capacity=50 GB and the minimum server count=3. Based on the specifications and requirements defined for an arbitrary software-defined storage stack (in this example scenario), assume that the required total raw storage to satisfy a 50 GB storage request across three nodes is 300 GB (which includes spare capacity and usable storage). Therefore, for this illustrative example, the required total raw storage per server is 100 GB (i.e., total required raw storage/node count=100). An example embodiment can then include traversing (e.g., in sequential order) the data structure generated in connection with the inventory associated with this example scenario. For each combination, such an embodiment includes calculating the difference between the total raw capacity per server and the required raw capacity per server, as follows:

Device Size=100 GB, Device Count=1, Servers=[Server-1, Server-2, Server-3], Total Raw Capacity Per Node=100 GB, Difference=0.

Device Size=100 GB, Device Count=2, Servers=[Server-1, Server-2, Server-3], Total Raw Capacity Per Node=200 GB, Difference=100

Device Size=200 GB, Device Count=1, Servers=[Server-1, Server-2, Server-3], Total Raw Capacity Per Node=200 GB, Difference=100

Device Size=500 GB, Device Count=1, Servers=[Server-1, Server-2]→Skipped

Device Size=1 TB, Device Count=1, Servers=[Server-3]→Skipped

It is noted that one or more embodiments of the invention include skipping and/or ignoring any combination wherein the total raw capacity per server is less than the required raw capacity per server. Further, based on the above-noted difference calculations in this example scenario, at least one embodiment includes selecting the first combination as indicated below:

Server-1 [/dev/sdb: 100 GB]
Server-2 [/dev/sdb: 100 GB]
Server-3 [/dev/sdb: 100 GB]

In the event wherein the difference calculations result in a tie, preference can be given, in accordance with one or more embodiments, to the result using the fewest number of devices. If no combination satisfied the total required raw storage per server, the minimum required server count would be incremented by a given number (e.g., one) and the process would return to the step of calculating the total raw storage per server for each combination. Such an embodiment includes enabling results to be processed by adding one or more servers at a time until a combination that satisfies the request is determined and/or identified. Note also that, in accordance with such an embodiment, the breakdown and/or organization of the user's inventory into a data structure (such as detailed herein) is carried out once, and the data structure is re-used if the minimum server count needs to be incremented.

Figure 2:
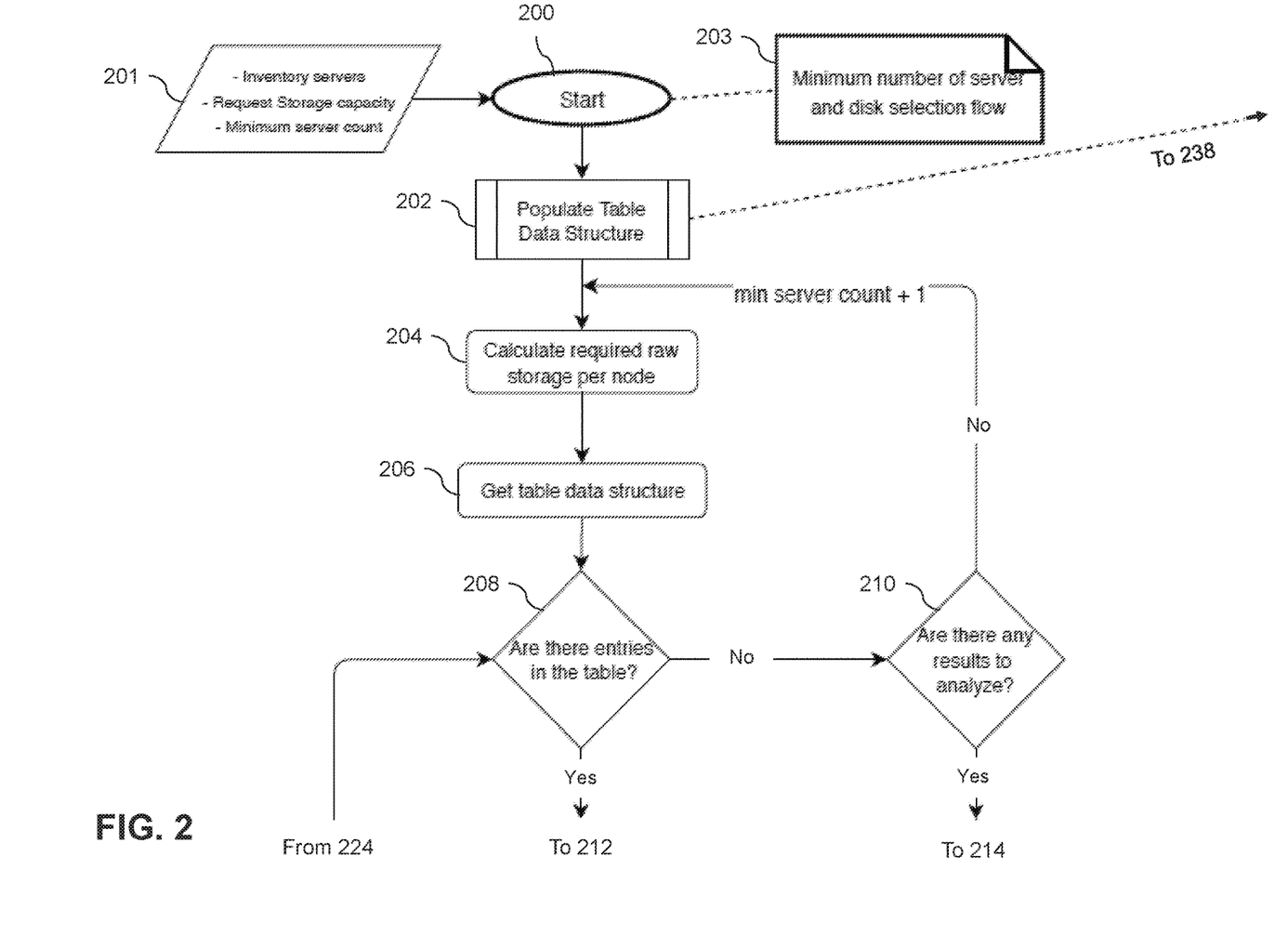
FIG. 2 shows a flow diagram of processes for automated resource selection for software-defined storage deployment in an illustrative embodiment.

FIG. 2 shows a flow diagram of a process for automated resource selection for software-defined storage deployment in an illustrative embodiment. Step 200 includes starting the process using inputs 201 (e.g., identification of inventor servers, requested storage capacity, minimum server counts, etc.) which can be provided in connection with a minimum number of server and disk selection workflow 203. Step 202 includes populating a table data structure, and step 204 includes calculating a required amount of raw storage per node. Step 206 includes obtaining the table data structure (populated in step 202), and step 208 includes determining whether there are entries in the table data structure. If no (that is, there are no entries in the table data structure), then step 210 includes determining whether there are any results to analyze. If no (that is, there are no results to analyze), then the process adds one to the minimum server count and returns to step 204. If yes (that is, there are results to analyze), then the process proceeds to step 214.

Referring again to the determination made in connection with step 208, if there are entries in the table data structure, then step 212 includes obtaining the next table data structure entry (which can include, for example, device size, device count, number of servers, etc.). From step 212, step 220 includes determining whether there is at least the required minimum server count of servers with devices of a given size. If no, then the process returns to step 208. If yes, then step 222 includes calculating the raw storage available per server for the table data structure entry (e.g., via workflow 221 which includes determining raw storage available per server by multiplying device size by device count). Step 224 then includes determining whether the calculated raw storage per server is greater than or equal to the required raw storage per server (indicated as part of the request). If no, then the process returns to step 208. If yes, then step 226 includes updating the table data structure entry to include the raw storage per server. Subsequently, step 228 includes adding an entry to the results for the table entry, wherein the added entry details to the given number of devices of the given sizes on the given servers.

Referring again to the above-noted step 214, the step includes determining whether there are any additional result entries to process. If no, the best result 216 is returned and the process ends at step 218. If yes, then step 230 includes obtaining the next result entry. Additionally, step 232 includes calculating the difference between the raw storage per node and the required raw storage per node for this entry. Step 234 then includes determining whether this is the best result based on the difference calculation. If no, the process returns to step 214. If yes, the process proceeds to step 236, wherein the current (best) result is recorded.

As also depicted in FIG. 2, using the table data structure populated in step 202, or generated via table data structure population workflow 237, step 238 starts a required process. More specifically, in one or more embodiments, populating a table data structure in step 202 requires the execution of step 238 for populating the table before proceeding to step 204. The process starting at step 238 includes proceeding to step 240, which includes obtaining the server inventory. Subsequently, step 242 includes determining whether there are more servers (to process) remaining in the inventory. If no, the process ends in step 244. If yes, then step 246 includes obtaining information pertaining to the next server from the inventory, and step 248 includes determining whether the server has any additional disks. If no, then the process returns to step 242. If yes, then step 250 includes obtaining information pertaining to the next disk on the server. Further step 252 includes adding an entry to the table data structure for the disk and server (such as depicted, for example, via the table data structure example 254), and returning to step 248.

Figure 3:
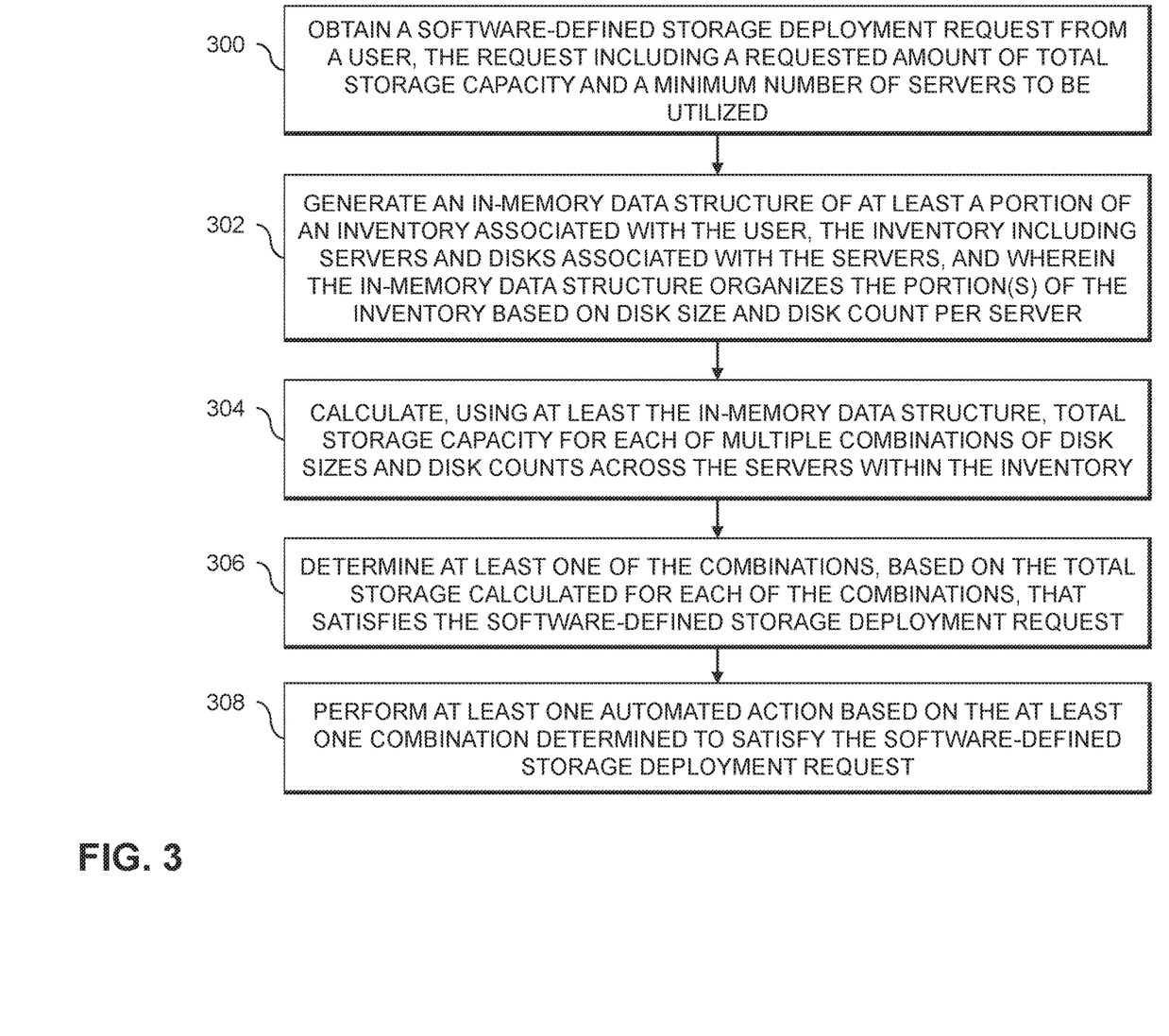
FIG. 3 is a flow diagram of a process for automated resource selection for software-defined storage deployment in an illustrative embodiment.

FIG. 3 is a flow diagram of a process for automated resource selection for software-defined storage deployment in an illustrative embodiment. It is to be understood that this particular process is only an example, and additional or alternative processes can be carried out in other embodiments.

In this embodiment, the process includes steps 300 through 308. These steps are assumed to be performed by the storage resource determination system 105 utilizing its modules 112, 114 and 116.

Step 300 includes obtaining a software-defined storage deployment request from at least one user, wherein the request comprises a requested amount of total storage capacity and a minimum number of servers to be utilized for the software-defined storage deployment. Step 302 includes generating an in-memory data structure of at least a portion of an inventory associated with the at least one user, wherein the inventory comprises multiple servers and multiple disks associated with the multiple servers, and wherein the in-memory data structure organizes the at least a portion of the inventory based at least in part on disk size and disk count per server.

Step 304 includes calculating, using at least the in-memory data structure, total storage capacity for each of multiple combinations of one or more disk sizes and one or more disk counts across one or more of the multiple servers within the inventory. In at least one embodiment, calculating total storage for each of multiple combinations includes calculating total storage for each combination that includes a server count greater than or equal to the minimum number of servers to be utilized for the software-defined storage deployment.

Step 306 includes determining at least one of the multiple combinations, based on the total storage calculated for each of the multiple combinations, that satisfies the software-defined storage deployment request. Step 308 includes performing at least one automated action based at least in part on the at least one combination determined to satisfy the software-defined storage deployment request. In at least one embodiment, the at least one combination determined to satisfy the software-defined storage deployment request includes two or more combinations, and wherein such an embodiment further includes calculating, for each of the two or more combinations, a difference between the total storage capacity of each combination and the requested amount of total storage capacity. Such an embodiment can also include determining, among the two or more combinations, the combination with the smallest calculated difference.

Further, in such an embodiment, performing the at least one automated action includes outputting, to the at least one user for use in a software-defined storage deployment, identifying information pertaining to the combination with the smallest calculated difference. Additionally or alternatively, such an embodiment further includes determining that each of the two or more combinations has the same calculated difference, and identifying one of the two or more combinations that comprises the least amount of server and disk devices. In such an embodiment, performing the at least one automated action includes outputting, to the at least one user for use in a software-defined storage deployment, identifying information pertaining to the combination that comprises the least amount of server and disk devices.

The techniques depicted in FIG. 3 can also include, for example, calculating an amount of storage required per server for the minimum number of servers to satisfy the software-defined storage deployment request. In such an embodiment, calculating the amount of storage required per server for the minimum number of servers can include incorporating a consideration for spare capacity on each server for replicating data across two or more of the multiple servers and/or incorporating a consideration for an amount of usable storage needed to satisfy the software-defined storage deployment request.

The particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate and perform calculations based on an in-memory data structure that organizes an inventory by disk size and disk count per server. These and other embodiments can effectively overcome problems associated with preventing the usage of inventory resources during resource selection determinations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
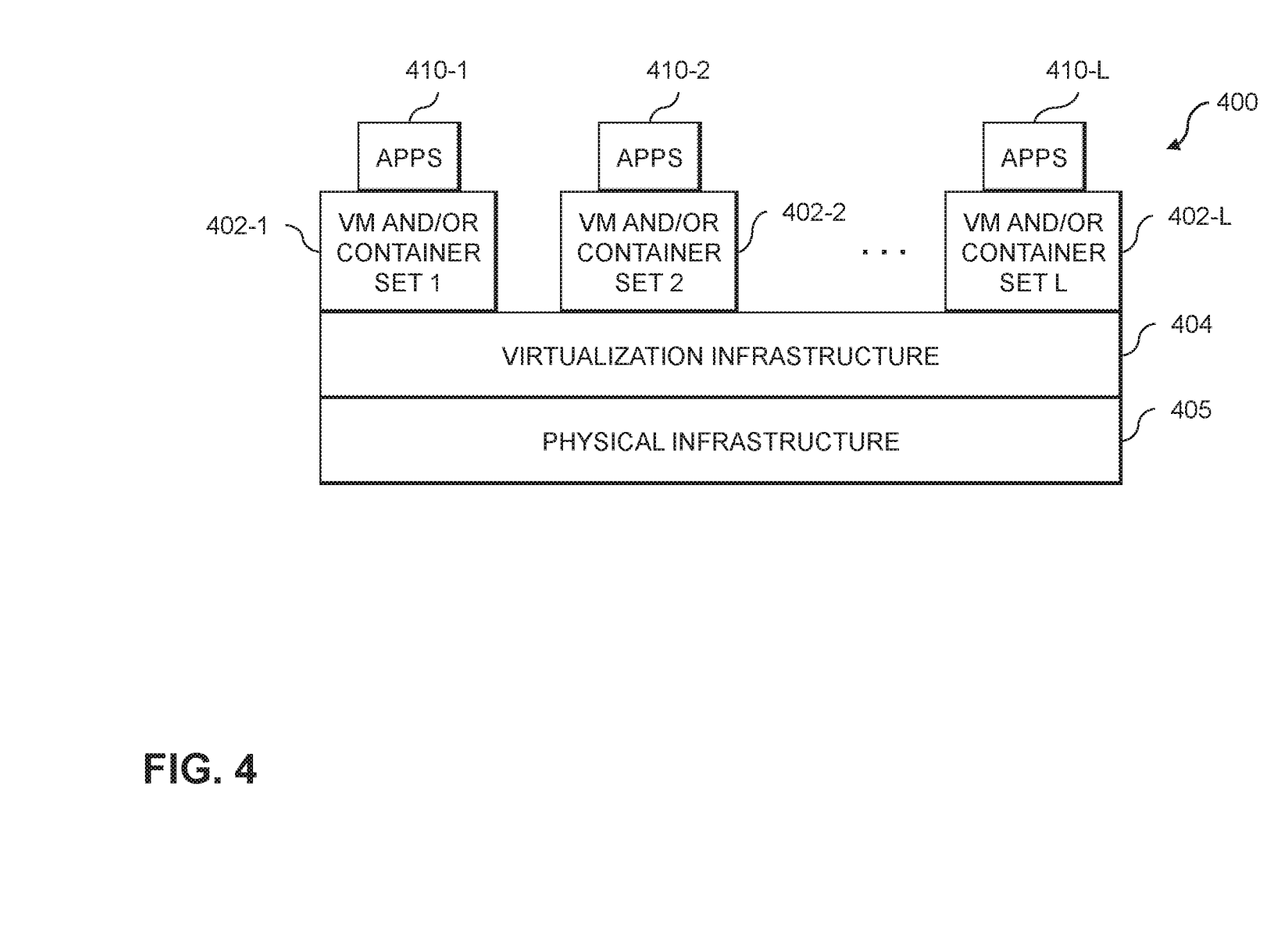
FIGS. 4 and 5 show examples of processing platforms that may be utilized to implement at least a portion of an information processing system in illustrative embodiments.
Figure 5:
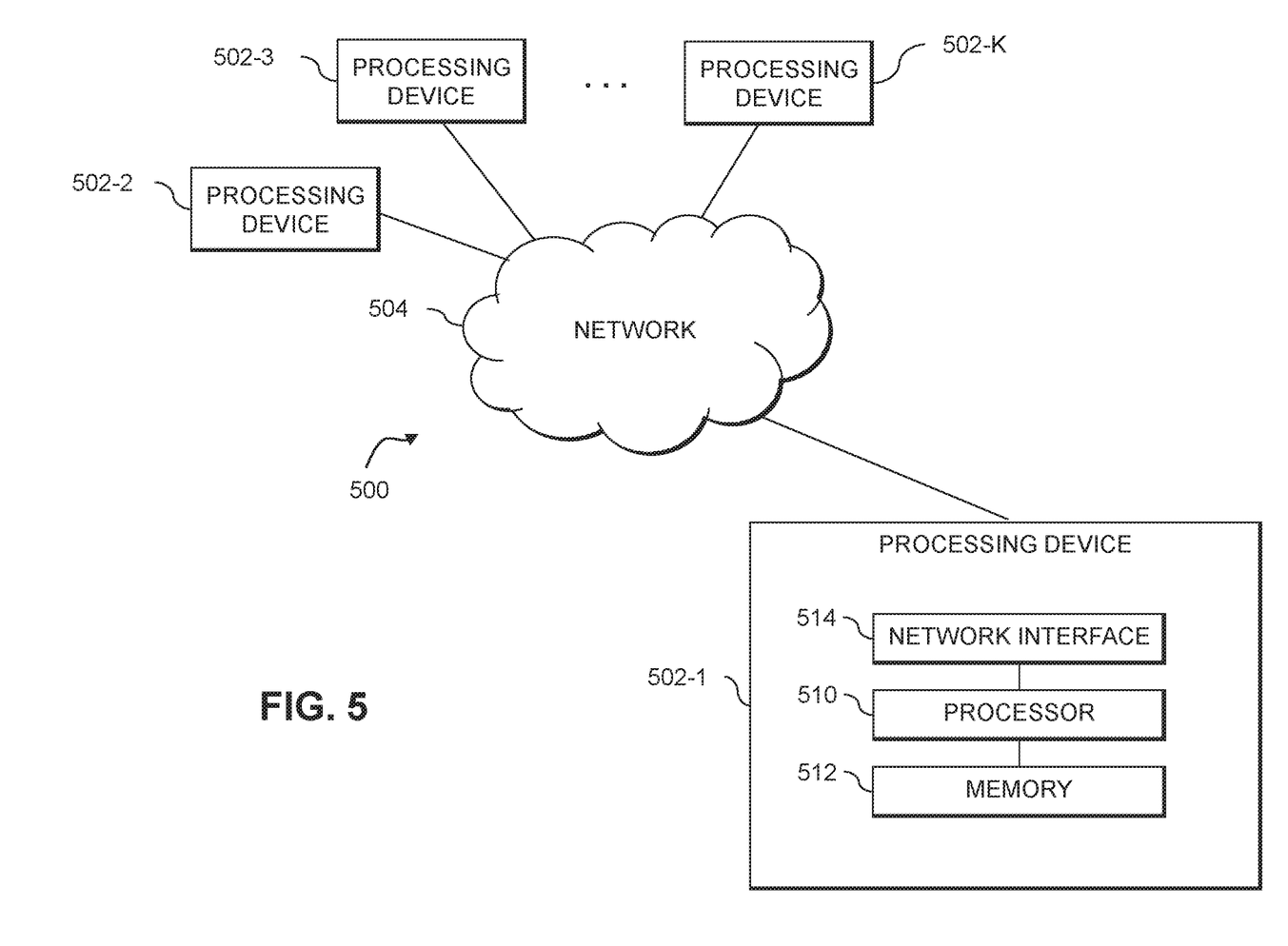

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, wherein the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, storage systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining a software-defined storage deployment request from at least one user, wherein the request comprises a requested amount of total storage capacity and a minimum number of servers to be utilized for the software-defined storage deployment;
    generating an in-memory data structure of at least a portion of an inventory associated with the at least one user, wherein the inventory comprises multiple servers and multiple disks associated with the multiple servers, and wherein the in-memory data structure organizes the at least a portion of the inventory based at least in part on disk size and disk count per server;

calculating, using at least the in-memory data structure, total storage capacity for each of multiple combinations of one or more disk sizes and one or more disk counts across one or more of the multiple servers within the inventory;

calculating an amount of storage required per server for the minimum number of servers to satisfy the software-defined storage deployment request;

determining at least one of the multiple combinations, based on the total storage calculated for each of the multiple combinations and the calculated amount of storage required per server, that satisfies the software-defined storage deployment request; and performing at least one automated action based at least in part on the at least one combination determined to satisfy the software-defined storage deployment request;

wherein the method is performed by at least one processing device comprising a processor coupled to a memory.

2. The computer-implemented method of claim 1, wherein the at least one combination determined to satisfy the software-defined storage deployment request comprises two or more combinations, and wherein the method further comprises calculating, for each of the two or more combinations, a difference between the total storage capacity of each combination and the requested amount of total storage capacity.

3. The computer-implemented method of claim 2, further comprising:
  determining, among the two or more combinations, the combination with the smallest calculated difference.

4. The computer-implemented method of claim 3, wherein performing the at least one automated action comprises outputting, to the at least one user for use in a software-defined storage deployment, identifying information pertaining to the combination with the smallest calculated difference.

5. The computer-implemented method of claim 2, further comprising:
  determining that each of the two or more combinations has the same calculated difference; and
  identifying one of the two or more combinations that comprises the least amount of server and disk devices.

6. The computer-implemented method of claim 5, wherein performing the at least one automated action comprises outputting, to the at least one user for use in a software-defined storage deployment, identifying information pertaining to the combination that comprises the least amount of server and disk devices.

7. The computer-implemented method of claim 1, wherein calculating total storage for each of multiple combinations comprises calculating total storage for each combination that includes a server count greater than or equal to the minimum number of servers to be utilized for the software-defined storage deployment.

8. The computer-implemented method of claim 1, wherein calculating the amount of storage required per server for the minimum number of servers comprises incorporating a consideration for spare capacity on each server for replicating data across two or more of the multiple servers.

9. The computer-implemented method of claim 1, wherein calculating the amount of storage required per server for the minimum number of servers comprises incorporating a consideration for an amount of usable storage needed to satisfy the software-defined storage deployment request.

10. A non-transitory processor-readable storage medium having stored therein program code of one or more software programs, wherein the program code when executed by at least one processing device causes the at least one processing device:
  to obtain a software-defined storage deployment request from at least one user, wherein the request comprises a requested amount of total storage capacity and a minimum number of servers to be utilized for the software-defined storage deployment;
  to generate an in-memory data structure of at least a portion of an inventory associated with the at least one user, wherein the inventory comprises multiple servers and multiple disks associated with the multiple servers, and wherein the in-memory data structure organizes the at least a portion of the inventory based at least in part on disk size and disk count per server;
  to calculate, using at least the in-memory data structure, total storage capacity for each of multiple combinations of one or more disk sizes and one or more disk counts across one or more of the multiple servers within the inventory;
  to calculate an amount of storage required per server for the minimum number of servers to satisfy the software-defined storage deployment request;
  to determine at least one of the multiple combinations, based on the total storage calculated for each of the multiple combinations and the calculated amount of storage required per server, that satisfies the software-defined storage deployment request; and
  to perform at least one automated action based at least in part on the at least one combination determined to satisfy the software-defined storage deployment request.

11. The non-transitory processor-readable storage medium of claim 10, wherein the at least one combination determined to satisfy the software-defined storage deployment request comprises two or more combinations, and wherein the program code when executed by the at least one processing device further causes the at least one processing device to calculate, for each of the two or more combinations, a difference between the total storage capacity of each combination and the requested amount of total storage capacity.

12. The non-transitory processor-readable storage medium of claim 11, wherein the program code when executed by the at least one processing device further causes the at least one processing device:
  to determine, among the two or more combinations, the combination with the smallest calculated difference, wherein performing at least one automated action comprises outputting, to the at least one user for use in a software-defined storage deployment, identifying information pertaining to the combination with the smallest calculated difference.

13. The non-transitory processor-readable storage medium of claim 11, wherein the program code when executed by the at least one processing device further causes the at least one processing device:
  to determine that each of the two or more combinations has the same calculated difference; and identifying one of the two or more combinations that comprises the least amount of server and disk devices, wherein performing at least one automated action comprises outputting, to the at least one user for use in a software-defined storage deployment, identifying information pertaining to the combination that comprises the least amount of server and disk devices.

14. The non-transitory processor-readable storage medium of claim 10, wherein calculating total storage for each of multiple combinations comprises calculating total storage for each combination that includes a server count greater than or equal to the minimum number of servers to be utilized for the software-defined storage deployment.

15. An apparatus comprising:
at least one processing device comprising a processor coupled to a memory;
the at least one processing device being configured:
to obtain a software-defined storage deployment request from at least one user, wherein the request comprises a requested amount of total storage capacity and a minimum number of servers to be utilized for the software-defined storage deployment;
to generate an in-memory data structure of at least a portion of an inventory associated with the at least one user, wherein the inventory comprises multiple servers and multiple disks associated with the multiple servers, and wherein the in-memory data structure organizes the at least a portion of the inventory based at least in part on disk size and disk count per server;
to calculate, using at least the in-memory data structure, total storage capacity for each of multiple combinations of one or more disk sizes and one or more disk counts across one or more of the multiple servers within the inventory;
to calculate an amount of storage required per server for the minimum number of servers to satisfy the software-defined storage deployment request;
to determine at least one of the multiple combinations, based on the total storage calculated for each of the multiple combinations and the calculated amount of storage required per server, that satisfies the software-defined storage deployment request; and
to perform at least one automated action based at least in part on the at least one combination determined to satisfy the software-defined storage deployment request.

16. The apparatus of claim 15, wherein the at least one combination determined to satisfy the software-defined storage deployment request comprises two or more combinations, and wherein the method further comprises calculating, for each of the two or more combinations, a difference between the total storage capacity of each combination and the requested amount of total storage capacity.

17. The apparatus of claim 16, wherein the at least one processing device is further configured:
to determine, among the two or more combinations, the combination with the smallest calculated difference, wherein performing at least one automated action comprises outputting, to the at least one user for use in a software-defined storage deployment, identifying information pertaining to the combination with the smallest calculated difference.

18. The apparatus of claim 16, wherein the at least one processing device is further configured:
to determine that each of the two or more combinations has the same calculated difference; and identifying one of the two or more combinations that comprises the least amount of server and disk devices, wherein performing at least one automated action comprises outputting, to the at least one user for use in a software-defined storage deployment, identifying information pertaining to the combination that comprises the least amount of server and disk devices.

19. The apparatus of claim 15, wherein calculating total storage for each of multiple combinations comprises calculating total storage for each combination that includes a server count greater than or equal to the minimum number of servers to be utilized for the software-defined storage deployment.

20. The apparatus of claim 15, wherein calculating the amount of storage required per server for the minimum number of servers comprises incorporating a consideration for spare capacity on each server for replicating data across two or more of the multiple servers.

* * * * *

UNITED STATES PATENT AND TRADEMARK OFFICE
CERTIFICATE OF CORRECTION

PATENT NO. : 11,163,462 B1
APPLICATION NO. : 16/861371
DATED : November 2, 2021
INVENTOR(S) : Trevor H. Dawe and Sean R. Gallacher It is certified that error appears in the above-identified patent and that said Letters Patent is hereby corrected as shown below:

In the Claims

In Claim 13, Column 14, Lines 63-66, replace:
"to determine that each of the two or more combinations has the same calculated difference; and identifying one of the two or more combinations that comprises the least amount of server and disk devices,"
With:
-- to determine that each of the two or more combinations has the same calculated difference; and to identify one of the two or more combinations that comprises the least amount of server and disk devices, --

In Claim 16, Column 16, Lines 5-11, replace:
"wherein the at least one combination determined to satisfy the software-defined storage deployment request comprises two or more combinations, and wherein the method further comprises calculating, for each of the two or more combinations, a difference between the total storage capacity of each combination and the requested amount of total storage capacity."
With:
-- wherein the at least one combination determined to satisfy the software-defined storage deployment request comprises two or more combinations, and wherein the at least one processing device is further configured to calculate, for each of the two or more combinations, a difference between the total storage capacity of each combination and the requested amount of total storage capacity. --

In Claim 18, Column 16, Lines 22-25, replace:
"to determine that each of the two or more combinations has the same calculated difference; and identifying one of the two or more combinations that comprises the least amount of server and disk devices,"
With:
-- to determine that each of the two or more combinations has the same calculated difference; and to identify one of the two or more combinations that comprises the least amount of server and disk devices, --

Signed and Sealed this
Twelfth Day of December, 2023

Katherine Kelly Vidal
*Director of the United States Patent and Trademark Office*